Patented Aug. 12, 1952

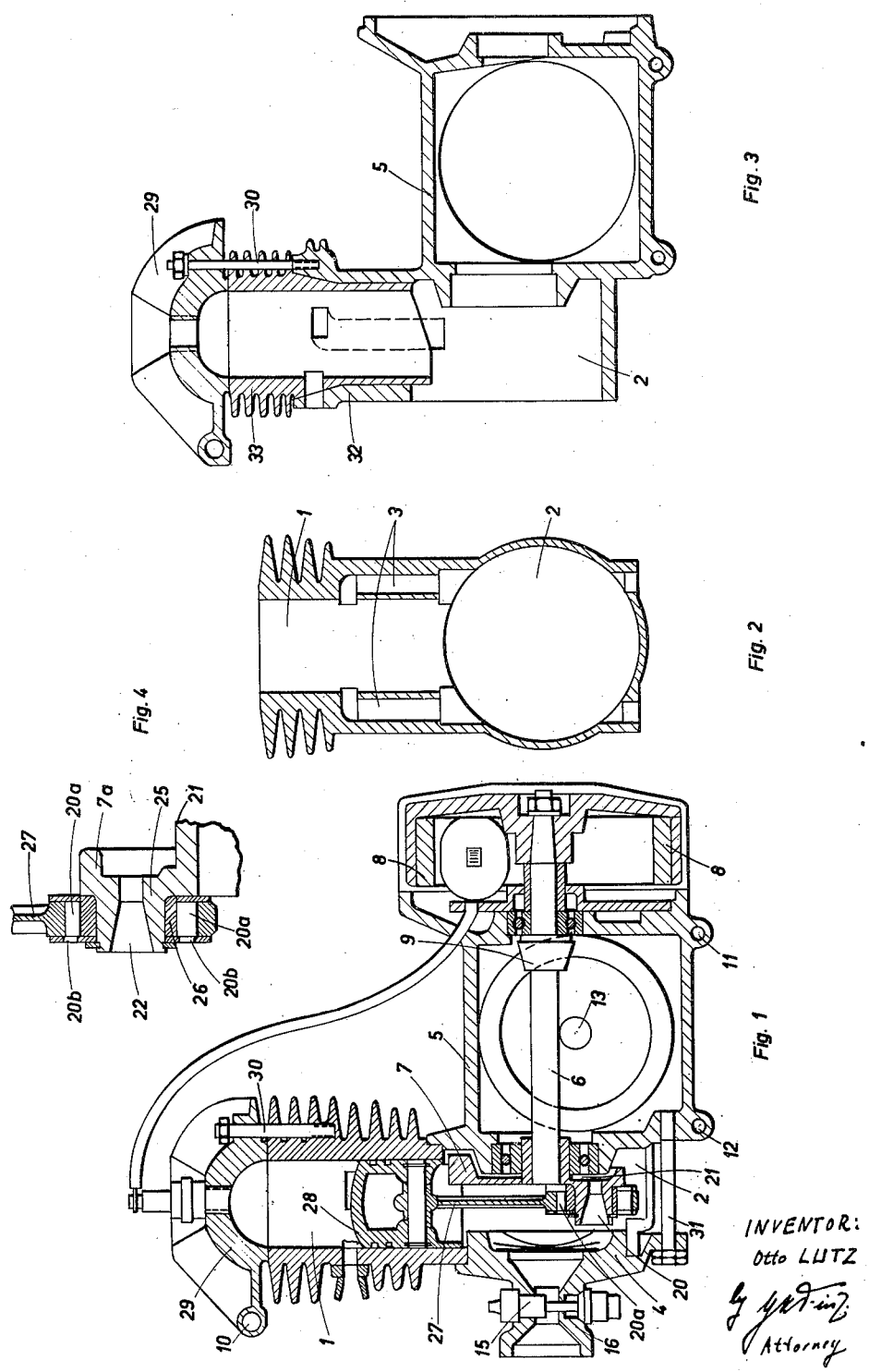

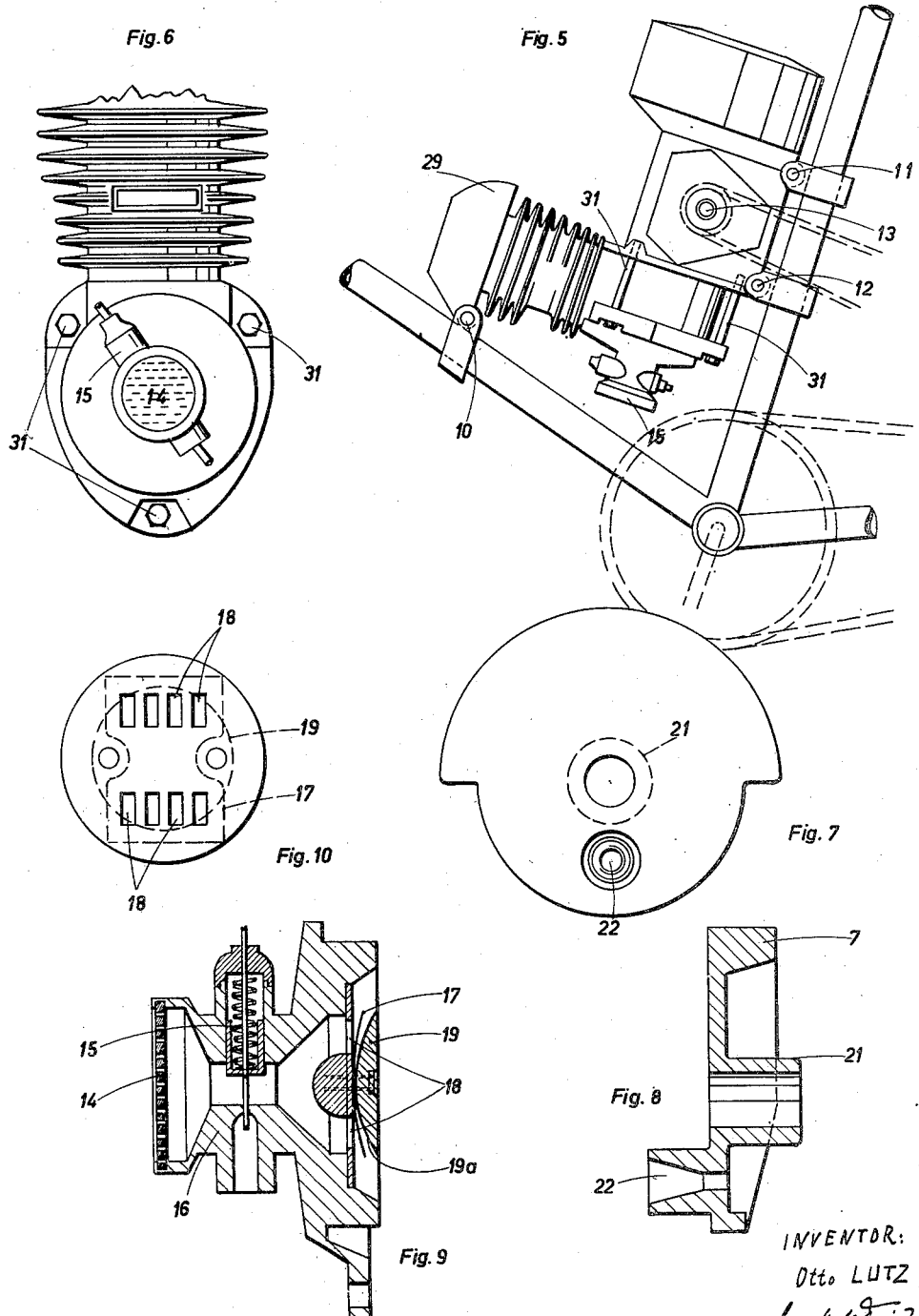

2,606,541

UNITED STATES PATENT OFFICE 2,606,541

INTERNAL-COMBUSTION ENGINE

Otto Lutz, Braunschweig, Germany

Application October 6, 1948, Serial No. 53,123
In Great Britain October 16, 1947

14 Claims. (Cl. 123—73)

My invention relates to small single cylinder internal combustion piston engines suitable for use, for example, as the auxiliary engines of pedal bicycles.

An object of my invention is to provide a sturdy cheap construction having a favourable power weight ratio and especially so in the case of small two-stroke single cylinder engines suitable for use as the auxiliary engine of a bicycle of ordinary construction.

To conduce to this end another object of the present invention is to provide a single cylinder internal combustion piston engine wherein the drive from the crank shaft to the output shaft is by way of a direct bevel gear and wherein the support of the crank shaft is by means of two widely spaced bearings, preferably ball bearings, both of which and the said bevel gear are disposed on one side of the crank, one bearing adjacent the crank and the other on the side of the bevel pinion remote from the crank so that the main structural parts of the engine consisting of the cylinder, crank case and gear box containing the said bevel gear may together form an L-shaped structure.

A further object of the invention is to obtain a smooth quiet drive with a spiral gear effect and with the bevel pinion preferably at one of the torsional vibration nodes of the crank shaft.

The invention further aims at a construction in which the members of the aforesaid L structure can be assembled components which are easy to inspect before assemblage and can be so constructed as to require but simple machining operations to make ready for use and to be readily assembled frictional spigot and faucet fashion with the aid of screw-nutted bolts. The jointing may be made tight by suitably choosing the unit contact pressure between machined metal surfaces or between these and suitable interposed packing.

The L shape of the engine as aforesaid enables it to fit very neatly in a cycle frame, for example, with the cylinder lying along the front down tube and the gear box lying along the rear down saddle tube or vice versa and the said output shaft may then be provided with a driving chain sprocket. Furthermore it is easy to arrange the mounting of the engine so that its centre of gravity lies on or substantially on a line passing through upper and lower points of suspension.

A further object of the invention is to construct the crank web for mass-balancing in such a manner as to allow for one of the bearings to be located close to the said web and so that the crank disc may be made very rigid and light in weight and conduces to easy balancing as well as to very small bending stresses by virtue of a very short lever arm between the centres of the crank pin bearing and the main bearing.

In the case of two-stroke engines the admission device for the combustible mixture may be designed as a diaphragm arranged on a grid shaped admission opening and held in position by a current limiting stop, the deflection of the diaphragm and thus the stresses of the diaphragm material at any point of the diaphragm being limited by the stop. This admission device may be arranged on the crank case cover, which latter may carry the carburettor and the air filter. The cover may form a part of the carburettor, for instance its casing, thus conducing to a simple, compact, robust and reliable construction. Likewise in the case of two stroke engines the lubricant is usually mixed with the petrol and the aforesaid arrangement of the admission device in the crank case cover has the advantage that the connecting rod bearing and crank shaft bearing are directly subjected to the gas stream of the petrol-oil mixture and are thus continuously lubricated and well cooled, ensuring long service life even under heavy load. The L-shape of the engine enables the crank case to be cast in one piece either with the cylinder or with the gear case. Either construction is favourable to manufacturing economies and weight reduction and increases the dimensional accuracy and rigidity of the motor.

Forming the cylinder and the crank case in one casting has the further advantage that the crank case may be fastened merely by clamping it between its cover and the gear box by bolting these two parts together. The transfer passages from the crank case to cylinder in the case of two-stroke engines may be conventionally formed in the casting, but to minimise expenditure of material and weight it is preferred to bore these transfer passages which assures their exact position and proper surface. This lessens the fuel consumption and the formation of eddies with resulting droplets from the gas mixture in two-stroke engines.

If the crank case and the gear box are combined in one casting, a shouldered down bottom of the cylinder can be received in a cylindrical extension of the crank case.

In either case the cylinder may be fitted with a liner. The cylinder head for two stroke engines is preferably fastened by means of screw-nutted bolts re-acting at points of the cylinder at the level of the ports where the cylinder wall is of ample thickness. In this way a distortion of the more sensitive upper zone of the cylinder is avoided.

To mount this novel engine, e. g., into a pedal bicycle frame, two suspension points are provided preferably arranged on an axis passing through the centre of gravity, a third fastening point being provided to receive the reaction moments.

In order that the present invention may be the more readily understood reference is hereinafter made to the constructional form for a two stroke engine illustrated by way of example in the accompanying drawings, in which form—

Fig. 1 shows a longitudinal section through an engine according to the invention.

Fig. 2 represents a diagrammatic cross section through the cylinder crank case casting and Fig. 3 shows a modified design, the crank case and gear box forming one casting.

Fig. 4 shows an enlarged view of the crank pin and big end bearing.

Fig. 5 shows a view of the engine mounted in the frame of a pedal bicycle.

Fig. 6 is an end view of the engine showing the method of bolting the main structural parts of the engine together.

Figs. 7 and 8 show an enlarged side view and sectional view of the disc crank.

Fig. 9 is a sectional view of the carburettor.

Fig. 10 a fragmentary view of the mixture admission device.

In Figs. 1 and 2 the cylinder 1 and the crank case 2 form one casting, the transfer passages 3 from the crank case to the cylinder admission ports being bored. One side of the crank case is closed by the cover 4, the other by the gear box 5 the case of which is formed by another casting. These parts are assembled by tie bolts 31 which clamp the crank case 2 between the flanges of the cover 4 and the casing 5 only through friction. This enables quick, simple and reliable assembling of the component parts.

The crank shaft 6 is supported exclusively by ball bearings in the end wall of the gear box 5. As shown the crank shaft 6 carries at one end the crank web 7 and at the other end the fly wheel magnet 8. A bevel gear is used. The bevel pinion 9 is fixed on the crank shaft at the vibration node, thus reducing wear and noise of the gearing to a minimum. The axis of the crank shaft is arranged with reference to the axis of the output shaft 13 so that the two do not intersect and the pinion directly engages the wheel to produce a spiral gear effect.

The cylinder and crank case casting on the one hand and the juxtaposed gear case with attached fly wheel magnet on the other hand— are arranged with the cylinder and gear box axes at right angles to one another in the shape of an L. One leg which on occasion may be the vertical leg of the L is formed by the cylinder and the other leg which on occasion may be the horizontal leg by the gear case, the latter being at right angles to the general plane of the disc crank. For fastening this unit e. g., in the frame of a bicycle, two suspension points 10 and 11 are provided on an axis through the centre of gravity. A third fixing point 12 may be provided to receive the reaction moments. In case the engine is used as a bicycle motor, a sprocket wheel is fixed on the shaft 13 driven from the crank shaft 6.

Though other designs are possible, it is advisable to combine the carburettor, the airfilter and the admission device with the crank case cover 4. The crank case cover may be designed to enable the air filter 14 to be attached by clamping or otherwise fixed in an easily interchangeable manner in front of the carburettor 15, the latter in the illustrated example including part of the cover 4 which forms the carburettor casing 16. The admission device may consist of a diaphragm 17 held in position on grid shaped admission openings 18 in the cover 4 by a stop body 19 which limits the deflection of the diaphragm by a bent stop surface 19a. The position of the admission device will be preferably chosen such that the suction gas stream strikes the connecting rod bearing 20 and the main crank shaft bearing 21, thus lubricating and cooling these two bearings sufficiently even under heavy loading of the engine. The admission of the petrol-oil mixture to the rollers of the connecting rod bearing 20a may be facilitated by holes in the end plates 20b of this bearing. A central opening 22 may be provided through the crank pin to permit the passage of the gas stream to the main crank bearing 21. The crank web may consist of ordinary unalloyed steel to avoid detrimental distortion by heat treatment. The crank pin 40 projects from one face of the web 7 which is in the form of a disc, the other face of which has an annular recess 42 opening towards the gear box, the inner rim 43 of the recess forming the hub for receiving the end of the crank shaft and the disc having radial and axial mass-balancing extensions of the portion 44 of the outer rim 7a remote from the crank pin. The main bearing 21 is located in the recess between its inner face and a spigot portion 46 of the gear box intruding into the recess. A sufficient strength of the web is afforded by its doubling U-shaped cross section. In the main bearing 21 is mounted the hub which is pushed on the crank shaft and is located for the most part within the outer rim 7a. In order to obtain the required surface hardness of the crank pin a hardened steel sleeve 26 may be pressed on to the pin. The thin-walled sleeve 26 is thoroughly hardened, thus avoiding the frequently insufficient case hardening depth of conventional crank pins. The cost of production is reduced by this arrangement because the price of hardened parts depends on their weight according to the required expenditure of heat. Besides the small sleeve can be properly centreless ground.

The structural parts not yet described, such as connecting rod 27, piston 28, cylinder head 29 etc., are of normal design. It is convenient and advantageous to fasten the cylinder head 29 on the cylinder 1 with the aid of tie bolts 30 which are fastened to the cylinder 1 at the level of the ports, i. e., at a point where the cylinder wall is of ample thickness, thus securing reliable reception of the retaining forces and avoiding the danger of the most sensitive upper zone of the cylinder barrel being distorted. The design and arrangement of some parts may be modified, e. g., the admission device could be arranged at the side of the crank case closed by the gear box 5. In this modification the arrangement may be such that the gas mixture may enter the crank case through the main crank bearing 21 lubricating on its way this bearing and the connecting rod bearing. In this case the carburettor and air filter could remain in their former position or could for instance be installed in the space between the two legs of the L, by providing a suitable suction pipe to the crank case.

Fig. 3 shows a modification of the L-construction where gear box 5 and crank case 2 with cylindrical extension 3a form one casting. In this case a shouldered down crank case end of the cylinder 33 may be received in said extension 32 of the crank case. The contact surfaces between the cylinder shoulder (shown conical) and the corresponding mating part of the aforesaid extension are situated at the level of the ports, thus improving the heat transmission and avoiding distortions in the port region.

What I claim is:

1. A single cylinder internal combustion piston engine comprising a cylinder and a crank shaft the axes of which are at right angles to each other, a crank case, two bearings by which said crank shaft is supported, a power output shaft and a bevel reduction gear through which said crank shaft directly drives said output shaft a case containing said gear, said bevel reduction gear comprising a bevel pinion and a bevel wheel and said bevel pinion engaging said bevel wheel in the half of the wheel remote from the said cylinder axis, one of said bearings being disposed in said gear case adjacent to the crank and between the crank and the said bevel pinion and the other of the said bearings being disposed in said gear case adjacent to the said pinion and on the side of the pinion remote from the crank.

2. A single cylinder internal combustion piston engine comprising a cylinder and a crank shaft, the axes of which are at right angles to each other, two bearings supporting said crank shaft, a bevel reduction gear through which said crank shaft directly drives said output shaft, said bevel reduction gear comprising a bevel pinion and a bevel wheel and said bevel pinion engaging the said bevel wheel in the half of the wheel remote from the said cylinder axis, one of said bearings being disposed adjacent the crank and between the crank and the said bevel pinion and the other of said bearings being disposed adjacent to the said pinion in the half of the wheel remote from the crank, the crank being in the form of a disc having a crank pin projecting from one face of said disc, the opposite face of said disc having an annular recess forming an outer rim and an inner cylindrical hub in which the end of said crank shaft is fixed and on which seats the said bearing adjacent the crank, and said disc having radial and axial extensions of its outer rim remote from the crank pin to mass-balance the reciprocating parts of the engine.

3. An engine according to claim 2, comprising a connecting rod and a ball or roller bearing supporting said connecting rod on said crank pin.

4. An engine according to claim 2, said bevel reduction gear being in a case having a spigot which intrudes into said recess, said bearing adjacent the crank being a ball bearing located between said hub and said spigot.

5. A single cylinder internal combustion piston engine comprising a cylinder and a crank shaft the axes of which are at right angles to each other, two bearings supporting said crank shaft a power output shaft, a bevel pinion on said crank shaft and a bevel wheel on said power output shaft forming a direct reduction gear drive between the crank shaft and the output shaft, said bevel pinion engaging said bevel wheel in the half of the wheel remote from the said cylinder axis, one of said bearings being disposed adjacent to the crank and between the crank and the said bevel pinion and the other of the said bearings being disposed adjacent to the said pinion and on the side of the pinion remote from the crank, a connecting rod and a bearing supporting said rod on the crank, a crank casing, a casing containing said bevel pinion and wheel, said latter case extending from one end of said crank casing, the other end of said crank casing being provided with a separate cover and means in said cover permitting the combustible mixture and lubricant to be led into the crank case so that the stream of mixture and lubricant cools and lubricates the said connecting rod bearing and the said crank shaft bearing adjacent the crank.

6. An engine according to claim 5, comprising a grid carried by said cover, a diaphragm normally covering said grid and arranged to be deflected off the grid for the passage of the mixture through the grid into the crank case and a dome-shaped member forming a stop for the diaphragm in its opening movement and limiting the said movement, said cover having an outward extension, and carburettor and mixture control means being carried by said extension.

7. An engine according to claim 1, in which the driving pinion of the bevel gear is located at a torsional vibration mode of the crank shaft.

8. An engine according to claim 1, comprising a gear case containing said bevel gear and a flywheel magnet disposed on the end of said crank shaft remote from the crank and outside the gear case.

9. A single cylinder internal combustion piston engine comprising a cylinder and a crank shaft the axes of which are at right angles to each other, a crank case, two bearings by which said crank shaft is supported, a power output shaft and a bevel reduction gear through which said crank shaft directly drives said output shaft, a case containing said gear, said bevel reduction gear comprising a bevel pinion and a bevel wheel and said bevel pinion engaging said bevel wheel in the half of the wheel remote from the said cylinder axis, one of said bearings being disposed in said gear case adjacent to the crank and between the crank and the said bevel pinion and the other of the said bearings being disposed adjacent to the said pinion and on the side of the pinion remote from the crank, the axis of said crank shaft making a chord with said wheel and not intersecting the axis of the output shaft.

10. A single cylinder internal combustion piston engine comprising a cylinder and a crank shaft the axes of which are at right angles to each other, a crank case, two bearings by which said crank shaft is supported, a power output shaft and a bevel reduction gear through which said crank shaft directly drives said output shaft, a case containing said gear, said bevel reduction gear comprising a bevel pinion and a bevel wheel and said bevel pinion engaging said bevel wheel in the half of the wheel remote from the said cylinder axis, one of said bearings being disposed in said gear case adjacent to the crank and between the crank and the said bevel pinion and the other of the said bearings being disposed in said gear case adjacent to the said pinion and on the side of the pinion remote from the crank, said crank case and the case of said cylinder being formed from a single casting and said gear case being formed as another casting, said gear case casting being secured to one end and an end cover being fitted to the other end of the crank case.

11. A single cylinder internal combustion piston engine comprising a cylinder and a crank shaft the axes of which are at right angles to each other, a crank case, two bearings by which said crank shaft is supported, a power output shaft and a bevel reduction gear through which said crank shaft directly drives said output shaft, a case containing said gear, said bevel reduction gear comprising a bevel pinion and a bevel wheel and said bevel pinion engaging said bevel wheel in the half of the wheel remote from the said cylinder axis, one of said bearings being disposed in said gear case adjacent to the crank and between the crank and the said bevel pinion and the other of the said bearings being disposed in said gear case adjacent to the said pinion and on the side of the pinion remote from the crank, said crank case and said gear case being formed from a single casting and the case of said cylinder being formed from a separate casting and inserted in said combined crank case and gear case casting.

12. An engine according to claim 11, said crank and gear box casting having a cylindrical extension from the crank casing, said cylinder casing having a shouldered down portion which makes frictional spigot and faucet engagement with the crank casing, the joints between them being secured by bolting together.

13. A single cylinder internal combustion piston engine comprising a casing providing a cylinder and a crank shaft, the axes of which are at right angles to each other, a crank casing, two bearings by which said crank shaft is supported, a power output shaft and a bevel reduction gear through which said crank shaft directly drives said output shaft, a casing for said gear, said bevel reduction gear comprising a bevel pinion and a bevel wheel and said bevel pinion engaging said bevel wheel in the half of the wheel remote from the said cylinder axis, one of said bearings being disposed in said gear casing adjacent to the crank and between the crank and the said bevel pinion and the other of the said bearings being disposed in said gear casing adjacent to the said pinion and on the side of the pinion remote from the crank, said crank casing being cast in one piece with one of said other casings, mixture admission ports in the cylinder casing, and transfer passages bored through the wall of the crank casing and leading from the crank casing to said ports.

14. An engine according to claim 13, comprising a cylinder head fastened by tie bolts to the cylinder casing substantially at the level of said mixture admission ports.

OTTO LUTZ.

REFERENCES CITED

The following references are of record in the file of this patent:

UNITED STATES PATENTS

| Number | Name | Date |
|---|---|---|
| 688,838 | Dorsey | Dec. 17, 1901 |
| 868,497 | Smith | Oct. 15, 1907 |
| 1,219,377 | Davidson | Mar. 13, 1917 |
| 1,308,022 | Christensen | July 1, 1919 |
| 1,322,266 | Roehl | Nov. 18, 1919 |
| 1,424,705 | Abell | Aug. 1, 1922 |
| 1,425,057 | Rowledge | Aug. 8, 1922 |
| 1,661,550 | Vincent | Mar. 6, 1928 |
| 1,672,436 | Thege | June 7, 1928 |
| 1,698,044 | Woolson | Jan. 8, 1929 |
| 1,812,456 | Tapp | June 30, 1931 |
| 2,133,458 | Lesage | Oct. 18, 1938 |
| 2,192,442 | Hoffman | Mar. 5, 1940 |
| 2,390,960 | Raybon | Dec. 11, 1945 |

FOREIGN PATENTS

| Number | Country | Date |
|---|---|---|
| 600,271 | France | of 1925 |
| 603,782 | France | of 1926 |